(12) United States Patent
Mizoguchi

(10) Patent No.: US 8,311,266 B2
(45) Date of Patent: Nov. 13, 2012

(54) IMAGE PROCESSING APPARATUS AND ACCOUNTING SYSTEM

(75) Inventor: Yoshihiro Mizoguchi, Nar (JP)

(73) Assignee: Sharp Kabushiki Kaisha, Osaka-Shi, Osaka (JP)

( * ) Notice: Subject to any disclaimer, the term of this patent is extended or adjusted under 35 U.S.C. 154(b) by 992 days.

(21) Appl. No.: 12/070,670

(22) Filed: Feb. 19, 2008

(65) Prior Publication Data

US 2009/0052731 A1 Feb. 26, 2009

(30) Foreign Application Priority Data

Feb. 19, 2007 (JP) ................... 2007-038474

(51) Int. Cl.
*G06K 9/00* (2006.01)
(52) U.S. Cl. ....................................... 382/100
(58) Field of Classification Search ............... 382/100, 382/112, 102
See application file for complete search history.

(56) References Cited

U.S. PATENT DOCUMENTS

| | | | |
|---|---|---|---|
| 7,730,224 B2 * | 6/2010 | Kikuchi ........................ 710/8 |
| 7,916,323 B2 * | 3/2011 | Nishiguchi ................ 358/1.15 |
| 2002/0051164 A1 * | 5/2002 | Watanabe et al. ........... 358/1.13 |
| 2002/0196452 A1 * | 12/2002 | Komiya ........................ 358/1.1 |
| 2002/0198954 A1 * | 12/2002 | Okamoto et al. ............. 709/213 |
| 2004/0225886 A1 * | 11/2004 | Lahey et al. .................. 713/193 |
| 2005/0065857 A1 * | 3/2005 | Sakai et al. ..................... 705/26 |
| 2005/0068566 A1 * | 3/2005 | Nishiguchi ................... 358/1.15 |
| 2007/0097161 A1 * | 5/2007 | Ejiri et al. ........................ 347/5 |
| 2007/0160378 A1 * | 7/2007 | Matsuda ........................ 399/79 |
| 2007/0226807 A1 * | 9/2007 | Ginter et al. ................... 726/27 |

FOREIGN PATENT DOCUMENTS

| | | |
|---|---|---|
| JP | 2002-116835 | 4/2002 |
| JP | 2003-259079 | 9/2003 |
| JP | 2005-010944 | 1/2005 |
| JP | 2006-155352 | 6/2006 |
| JP | 2006-227703 | 8/2006 |

* cited by examiner

*Primary Examiner* — Chan S Park
*Assistant Examiner* — Avinash J Yentrapati
(74) *Attorney, Agent, or Firm* — Edwards Wildman Palmer LLP; David G. Conlin; George N. Chaclas

(57) ABSTRACT

The present invention provides an image processing apparatus and an accounting system which comprise an accounting section of a high degree of flexibility in accounting for the output of image data. The accounting system is primarily made up of a client PC 100 including a keyboard 109, an administration server 201 including an accounting section 222 and a memory 221, and an image processing apparatus 202 including an administration section 231 and a printing section 233. The memory 221 stores an accounting table. The administration section 231 stores image data. The accounting section 222 extracts the document name of image data and the number of the image data outputs, from an operating instruction input from the keyboard 109, and determines an accounting from an administration table based on the extracted result.

6 Claims, 10 Drawing Sheets

| NUMBER | DOCUMENT NAME | PERIOD OF VALIDITY | CHARGE FOR FIRST TIME | CHARGE FOR SECOND OR LATER TIME |
|---|---|---|---|---|
| 1 | DOCUMENT A | TILL 11/30 | 30 YEN | 30 YEN |
| 2 | DISCOUNT COUPON A | TILL 11/30 | 0 YEN | 20 YEN |
| 3 | INVITATION COUPON A | TILL 11/30 | 10 YEN | 20 YEN |
| 4 | DOCUMENT A | FROM 12/1 | 40 YEN | 40 YEN |
| 5 | DISCOUNT COUPON A | FROM 12/1 | 0 YEN | 30 YEN |
| 6 | INVITATION COUPON A | FROM 12/1 | 10 YEN | 30 YEN |
| 7 | OTHERS | ALWAYS VALID | 50 YEN | 45 YEN |

FIG. 3

| NUMBER | DOCUMENT NAME | PERIOD OF VALIDITY | CHARGE FOR FIRST TIME | CHARGE FOR SECOND OR LATER TIME |
|---|---|---|---|---|
| 1 | DOCUMENT A | TILL 11/30 | 30 YEN | 30 YEN |
| 2 | DISCOUNT COUPON A | TILL 11/30 | 0 YEN | 20 YEN |
| 3 | INVITATION COUPON A | TILL 11/30 | 10 YEN | 20 YEN |
| 4 | DOCUMENT A | FROM 12/1 | 40 YEN | 40 YEN |
| 5 | DISCOUNT COUPON A | FROM 12/1 | 0 YEN | 30 YEN |
| 6 | INVITATION COUPON A | FROM 12/1 | 10 YEN | 30 YEN |
| 7 | OTHERS | ALWAYS VALID | 50 YEN | 45 YEN |

FIG. 4

| NUMBER | USER NAME | PERIOD OF VALIDITY | CHARGE FOR FIRST TIME | CHARGE FOR SECOND OR LATER TIME |
|---|---|---|---|---|
| 1 | USER A | TILL 11/30 | 30 YEN | 30 YEN |
| 2 | USER B | TILL 11/30 | 0 YEN | 20 YEN |
| 3 | USER C | TILL 11/30 | 10 YEN | 20 YEN |
| 4 | USER A | FROM 12/1 | 40 YEN | 40 YEN |
| 5 | USER B | FROM 12/1 | 0 YEN | 30 YEN |
| 6 | USER C | FROM 12/1 | 10 YEN | 30 YEN |
| 7 | OTHERS | ALWAYS VALID | 50 YEN | 45 YEN |

FIG. 5

| NUMBER | INSTALLATION LOCATION NAME | PERIOD OF VALIDITY | CHARGE FOR FIRST TIME | CHARGE FOR SECOND OR LATER TIME |
|---|---|---|---|---|
| 1 | CONVENIENCE STORE A | TILL 11/30 | 30 YEN | 30 YEN |
| 2 | SCHOOL A | TILL 11/30 | 0 YEN | 20 YEN |
| 3 | CORPORATION A | TILL 11/30 | 10 YEN | 20 YEN |
| 4 | CONVENIENCE STORE A | FROM 12/1 | 40 YEN | 40 YEN |
| 5 | SCHOOL A | FROM 12/1 | 0 YEN | 30 YEN |
| 6 | CORPORATION A | FROM 12/1 | 10 YEN | 30 YEN |
| 7 | OTHERS | ALWAYS VALID | 50 YEN | 45 YEN |

FIG. 6

| NUMBER | OUTPUT CONDITION | PERIOD OF VALIDITY | CHARGE FOR FIRST TIME | CHARGE FOR SECOND OR LATER TIME |
|---|---|---|---|---|
| 1 | DOUBLE-SIDED PRINTING | TILL 11/30 | 30 YEN | 30 YEN |
| 2 | 2-UP TO 16-UP | TILL 11/30 | 0 YEN | 20 YEN |
| 3 | Fit To Page | TILL 11/30 | 10 YEN | 20 YEN |
| 4 | DOUBLE-SIDED PRINTING | FROM 12/1 | 40 YEN | 40 YEN |
| 5 | 2-UP TO 16-UP | FROM 12/1 | 0 YEN | 30 YEN |
| 6 | Fit To Page | FROM 12/1 | 10 YEN | 30 YEN |
| 7 | OTHERS | ALWAYS VALID | 50 YEN | 45 YEN |

IMAGE PROCESSING APPARATUS AND ACCOUNTING SYSTEM

CROSS-REFERENCE TO RELATED APPLICATION

This application claims priority to Japanese Patent Application No. 2007-038474, filed on Feb. 19, 2007, the disclosure of which is incorporated herein by this reference.

BACKGROUND OF THE INVENTION

1. Field of the Invention

The present invention relates to an image processing apparatus which allows accounting with a high degree of flexibility, and an accounting system including a plurality of image processing apparatuses.

2. Description of the Related Art

There is a service which utilizes an image processing apparatus installed in a shop etc. and reads image data stored in the storage section of the image processing apparatus or in an external administration server to make output. In the accounting method for such services, a predetermined fee is set for each image data, and it is general to account the set fee to the user who makes output.

In addition, Japanese Patent Laid-Open No. 2006-227703 discloses a service in which an accounting destination and an accounting method when output is made using an image processing apparatus are stored for each image data in an administration server, and when a user makes output of retained image data using the image processing apparatus, accounting is performed based on the accounting destination and the accounting method associated with the image data.

On the other hand, in the above described services, there are cases in which image data relating to complementary coupons such as a discount coupon or an invitation coupon is output. In such cases, a user may make output of the same image data multiple times.

For example, when the accounting relating to output of image data is set to be low, since accounting is performed at the set low value regardless of the number times for which output is made, single user may make print in a large amount. The situations in which image data is output are various, and there is a need for accounting which can flexibly cope with such situations.

Thus, in view of the above described problems, the present invention is directed to provide an image processing apparatus and an accounting system which can perform accounting with a high degree of flexibility in accounting for the output of image data.

SUMMARY OF THE INVENTION

In order to solve the above described problems, the present invention comprises an image processing section for making output of image data and an accounting section for determining a accounting for the output of image data, wherein the accounting section determines the accounting based on the situation in which image data is output and the frequency of the image data outputs.

The accounting section determines the accounting not only based on the situation in which image data is output, but also by combining it with the frequency of the image data outputs. For example, when a complementary coupon is printed, the accounting section determines the accounting by combining the kind of the complementary coupon, the time and date of output, the place of output, etc. with the frequency of the complementary coupon outputs.

By doing this, the accounting section can set an accounting for the output of image data in various ways. The administrator can prevent tampering such as that the same image data is output in a large amount to a single user. In this regard, the term "administrator" used herein refers to a person who provides image data, and the term "user" refers to a person who makes a request for output from the image processing apparatus to obtain an output result.

The situation in which an image data is output can be detected by a situation detection section. When an instruction for output is given by a user, the situation detection section detects the situation and outputs the detected result to the accounting section. This causes the accounting section to determine the situation every time image data is output.

In this respect, "the situation in which image data is output" refers to the image data to be output, the user who provides instruction for output of image data, the time and date when image data is output, the printing condition when image data is output, and the installation location of the image processing apparatus for making output of image data.

The frequency of the image data outputs can be detected by a frequency detection section. When an instruction for output is given by a user, the frequency detection section counts the number of image data outputs, and outputs the result thereof to the accounting section. Then, the magnitude of the frequency of output is made to be a requirement for determining the accounting. Further, the frequency of output may be determined not only by the number of times for which output is made, but also by adding up numbers of times for which output is made per time frame, per day of the week, and per month.

The accounting section may notify the content of determined accounting prior to the output of image data. This will allow the administrator to prevent non-payment events such as a case in which the output is taken away without accounting. Further, the user can avoid the situation in which a large amount of accounting is requested after output.

The accounting section determines the accounting by using an accounting table in association with the situation in which image data is output and the frequency of the image data outputs. The accounting is set in advance. The accounting section extracts and determines an accounting in association with detected situation in which image data is output and frequency of the image data outputs. That is, since the accounting section does not compute the accounting every time image data is output, it can quickly determine the accounting. Further, since there is no complex computation and therefore no need of providing a high performance apparatus, it is possible to save cost.

An accounting system comprises a plurality of image processing apparatuses for making output of image data, and an administration server for administering the aforementioned plurality of image processing apparatuses, wherein the aforementioned administration server comprises an accounting section for determining the accounting for the output of image data, and an acquisition section for acquiring information relating to the output of image data from the aforementioned image processing apparatuses, wherein the aforementioned accounting section determines the accounting based on the situation in which image data is output and the frequency of the image data outputs.

According to the above described configuration, the accounting section determines the accounting taking into consideration the information acquired by the acquisition section, that is, both the situation when output is made and the frequency at which output is made. Further, the accounting section is provided in an administration server that is installed outside the image processing apparatus. That is, the image processing apparatus needs to perform the determination of the accounting at the administration server installed outside the image processing apparatus. Thus, for all the image processing apparatuses connected to the administration server, the accounting is determined by the same accounting section provided in the administration server.

As so far described, according to the present invention, since the accounting for the output of image data is determined by taking into consideration both the situation when image data is output and the frequency at which image data is output, it is possible to set the accounting for the output of image data in various ways. This will make it possible to realize an image processing apparatus and an accounting system which allows accounting with a high degree of flexibility.

BRIEF DESCRIPTION OF THE DRAWINGS

FIG. 3 shows an accounting table in which the accounting is set in terms of a document name;

FIG. 4 shows an accounting table in which the accounting is set in terms of the user;

FIG. 5 shows a accounting table in which the accounting is set in terms of the installation location of the image processing apparatus;

FIG. 6 shows an accounting table in which the accounting is set in terms of the printing condition of image data;

DETAILED DESCRIPTION OF THE PREFERRED EMBODIMENTS

First Embodiment

Figure 1:
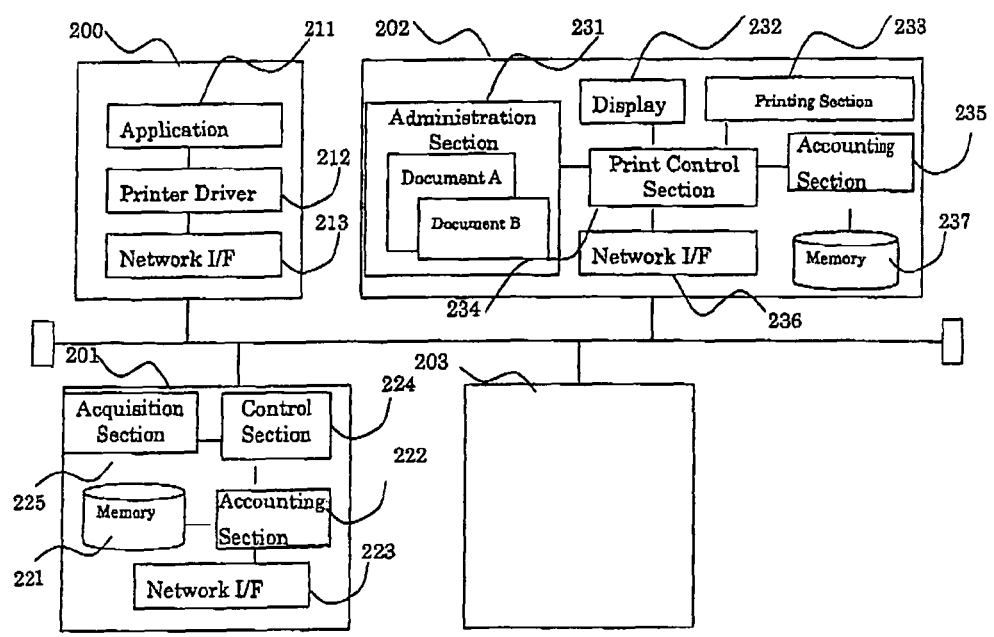
FIG. 1 is a block diagram to show the accounting system relating to a first embodiment of the present invention.

As shown in FIG. 1, the accounting system of the present embodiment is primarily made up of a client PC 100, an administration server 201, and a plurality of image processing apparatuses 202 and 203. The client PC 100, the administration server 201, and the image processing apparatuses 202 and 203 are connected via a network which is a communication medium. By this configuration, transmission/reception of data between each apparatus is performed via the network.

The accounting system comprises a function of accounting depending on image processing. Specifically, the accounting system comprises an accounting section (222, 235) for determining the accounting for the output of image data made by the image processing apparatuses 202 and 203, in the administration server 201 and the image processing apparatuses 202 and 203. One of the accounting sections 222 and 235 operates for the output of image data. The accounting section (222, 235) to be operated is preset and this setting information is owned by the client PC 100, the image processing apparatuses 202 and 203, and the administration server 201.

The accounting section (222, 234) determines the accounting taking into consideration both the situation in which image date is output and the frequency at which image data is output. Therefore, the accounting section (222, 235) comprises a situation detection section for detecting the situation in which image data is output, and a frequency detection section for detecting the frequency at which image data is output.

The situation detection section detects situations in which output is made such as the document name of the image data to be output, the name of the user who provides instruction for output of image data, the time and date when the image data is output, the printing condition when image data is output, and the installation location of the image processing apparatus for making output of image data, on the basis of the operating instruction by the user or the output information input from the image processing apparatus for making output.

The frequency detection section counts the frequency of output such as the number of the image data outputs, the number of times for which output is made by the user who provides instruction for output, the number of times for which output is made at the image processing apparatus which is selected as the output destination, and the number of times for which output is made on a set printing condition thereby detecting the number of times for which output is made.

According to the above described configuration, the accounting section (222, 235) detects the situation in which image data is output and the frequency at which output is made at each detection section. Then the accounting corresponding to the detected result is extracted and determined from an administration table in which the accountings corresponding to the situation in which image data is output and the frequency at which image data is output are set.

The accounting table is stored in a memory (221, 237) included in the administration server 201 and the image processing apparatuses 202 and 203. As shown in FIGS. 3 to 6, the accounting table includes, as examples of the situations when output is made, a document name, a user name, an installation location of image processing apparatus, a printing condition, and a time and date of output and, as examples of the frequency at which output is made, the number of times for which output is made. And the accounting table stores accountings corresponding to the situation in which each image data is output and the frequency at which image data is output are stored. Further, the items provided in the accounting table are only examples and will not be limiting.

The accounting table shown in FIG. 3 illustrates an example in which the accounting is set in terms of the document name of image data. The accounting table comprises a document name column, a period of validity column, an accounting for the first time output column, and an accounting for the second or later time output column. The document name column stores the document name relating to image data. The period of validity column stores the time and date when image data can be output. The accounting for the first time output column and the accounting for the second or later column store accountings specified for each image data. In this accounting table, for example, when the document name of image date is an "invitation coupon A", the accounting for the first time output is zero yen and the accounting for the second or later time output is 20 yen when the date when invitation coupon A is output is before November 30. On and after December 1, the accounting for the first time output is zero yen and the accounting for the second or later time output is 30 yen.

The accounting table shown in FIG. 4 illustrates an example in which the accounting is set in terms of the user who provides instruction for output of image data. Comparing with the accounting table of FIG. 3, the contents stored in the accounting table are all same except that the document name column has been changed to a user name column for storing user. In this accounting table, for example, when user name is a "user C", the accounting when image data is output is such that when the date of output is before November 30, the accounting for the first time output is 10 yen and the accounting for the second or later time output is 20 yen. And when the date of output is on and after December 1, the accounting for the first time output is 10 yen and the accounting for second or later time output is 30 yen.

The accounting table shown in FIG. 5 illustrates an example in which the accounting is set in terms of the installation location of image processing apparatus (202, 203) for making output of image data. Comparing with the accounting table of FIG. 3, the contents stored in the accounting table are all same except that the document name column has been changed to an installation location column which stores the installation location where image processing apparatus (202, 203) is installed. In this accounting table, for example, when the installation location is a "convenience store A", the accounting when image data is output will be such that when the date of output is before November 30, the accounting for the first time output is 30 yen and the accounting for the second or later time output is 30 yen. And when the time and date of output is on and after December 1, the accounting for the first time output is 40 yen and the accounting for the second or later time output is 40 yen.

The accounting table shown in FIG. 6 illustrates an example in which the accounting is set in terms of printing conditions of image data. Comparing with the accounting table of FIG. 3, the contents stored in the accounting table are all same except that the document name column has been changed to a printing condition column for storing the printing condition when image data is output. In this accounting table, for example, when the printing condition is a "double-sided printing", the accounting when image data is output is such that when the time and date of output is before November 30, the accounting for the first time output is 30 yen and the accounting for the second or later time output is 30 yen. And when the time and date when operating instruction is made is on and after December 1, the accounting for the first time output is 40 yen and the accounting for second or later time output is 40 yen.

Figure 7:
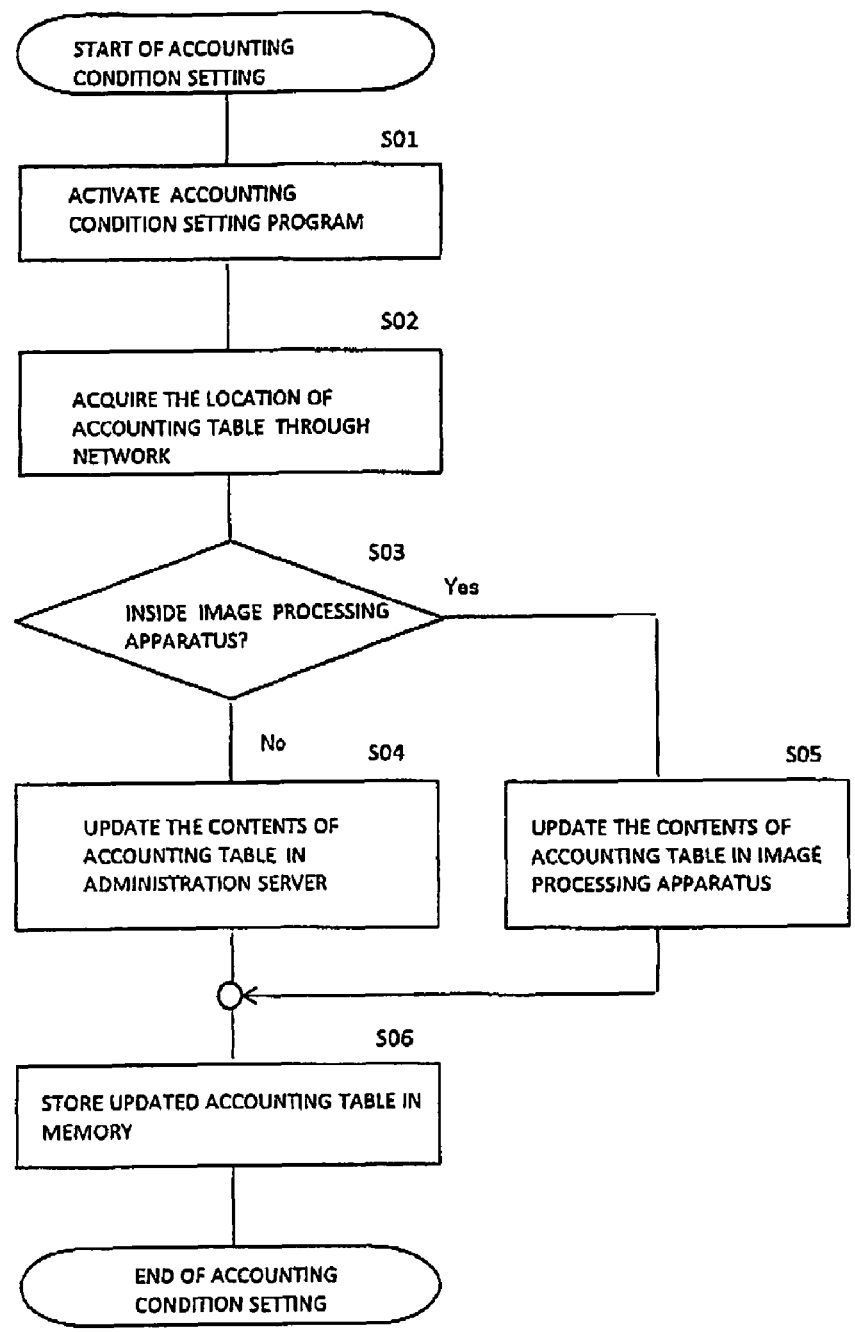
FIG. 7 is a flowchart to show an accounting information setting procedure.

For these accounting tables, the accounting is set according to the flowchart shown in FIG. 7. Specifically, first the administrator activates a accounting condition setting program which is stored in a client PC 100 described later or in an image processing apparatus 202 (S01). Then, the location where the accounting table is stored is confirmed (S02). For example, when the administration table is stored in the memory 237 of the image processing apparatus 202, the content of the administration table stored in the memory 237 of the image processing apparatus 202 is extracted. When the administration table is stored in the memory 221 of the administration server 201, the content stored in the memory 221 of the administration server 201 is extracted.

The accounting table is displayed on a display section 108 provided in the client PC 100 or in a display section 232 provided in the image processing apparatus 202. The administrator alters the sites to be updated out of the displayed accounting table (S04). When alteration is finished, the administrator stores updated accounting table into the memory 221, 237 from which the accounting table is extracted, thus finishing the process (S06).

The image processing apparatus (202, 203), which is a printing apparatus installed in corporations including a book store, a convenience store, and a printing firm, outputs image data based on the operating instruction from a user. Further, each image processing apparatus (202, 203) has same configuration. In this respect, the detail of the image processing apparatus will be described using the image processing apparatus 202.

The image processing apparatus 202 comprises an administration section 231 for storing and administering a plurality of image data, an accounting section 235 for determining the accounting depending on the output of image data, a memory 237 for storing an accounting table, a display section 232 for displaying the printed state of image data, a printing section 233 for printing image data, a ROM for storing a control program, a printing control section 234 for controlling the entire apparatus, and a network I/F 236 for connecting a network.

The administration section 231 stores image data which can be output. The image data is input from an external equipment via a network. Alternatively, it is input using a scanning function installed on the image processing apparatus 202. The administration section 231 stores the number of image data outputs. Specifically, it stores the number of times for which access is made for making output of image data.

The display section 232 is a liquid crystal display which displays an input button for inputting an operating instruction, a printed result of image data, and the like. The printing section 233 prints image data on a record sheet based on the instruction by the print control section.

The print control apparatus 234 controls these apparatuses based on various programs stored in a ROM. The print control section 234 controls the printing section 233 to print image data based on the operating instruction by the user. The print control section 234 outputs information relating to image data to be output, to the accounting section (222, 235).

Figure 2:
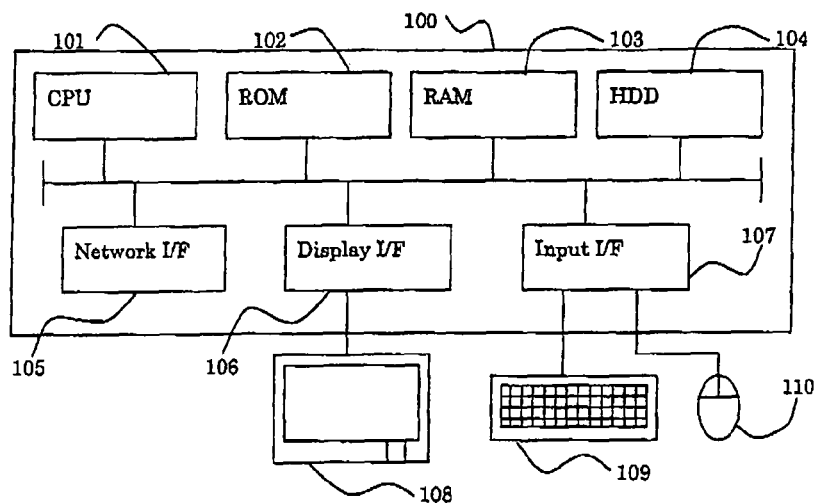
FIG. 2 is a block diagram to show the configuration of a client PC.

The client PC 100 is a terminal apparatus having an input I/F and installed in a book store, a convenience store, etc., a business computer used in a corporation, a personal computer used at home, and the like. The client PC 100 comprises, as shown in FIG. 2, a ROM 102 for storing a control program, a RAM 103 for temporally storing an operating instruction input from the user, a HDD 104 for retaining image data, a network I/F 105 for connecting a network, a display section 108 for displaying an output result of image data to be output, a display I/F 106 for connecting the display section 108, a keyboard 109 and a mouse 110 for inputting an operating instruction from the user, an input I/F 107 for connecting the keyboard 109 and the mouse 110, and a CPU 101 for controlling them. Each apparatus is connected by a predetermined bus allowing the transmission and reception of data between each apparatus.

The client PC 100 includes, as shown in FIG. 1, programs for driving various applications such as application software 111 for creating image data, and a printer driver 112 for sending image data to the image processing apparatus (202, 203). Those programs are stored in the ROM 102. The HDD 104 stores log information of operating instruction such as image data output based on an operating instruction by the user, a user name, a printing condition and an output time and date. The CPU 101 controls these apparatuses based on various programs stored in the ROM 102. Moreover, the CPU 101 outputs operating instructions input through a keyboard 109 or a mouse 110, to the image processing apparatus (202, 203) or the administration server 201 via a network.

The administration server 201 is a host computer etc. installed in a book store, a convenience store, a corporation which provides image data, or the like. The administration server 201 includes, as shown in FIG. 1, an accounting section 235 for determining the accounting corresponding to the output of image data, a memory 237 for storing an accounting table, an acquisition section 225 for acquiring information relating to the output of image data, a network I/F 223 for connecting a network, and a control section 224 for controlling them.

The acquisition section 225 acquires various information from the client PC 100 or the image processing apparatus (202, 203) and outputs the acquired information to the accounting section 222. Specifically, the acquisition section 225 acquires information from operating instructions input from the client PC 100 or the image processing apparatus (202, 203), and from the information relating to the output of image data input from the image processing apparatus.

In this respect, "various information" includes the document name of the image data to be output, the name of the user who provides instruction for output of image data, the date when image data is output, the printing condition when image data is output, the installation location of the image output apparatus for making output of image data, the number of times for which the image data to be output is output, the number of times for which output is made by the user who provides instruction for output, the number of times for which output is made at the image processing apparatus which is selected as output destination, the number of times for which output is made under a set printing condition, and the like.

Figure 8:
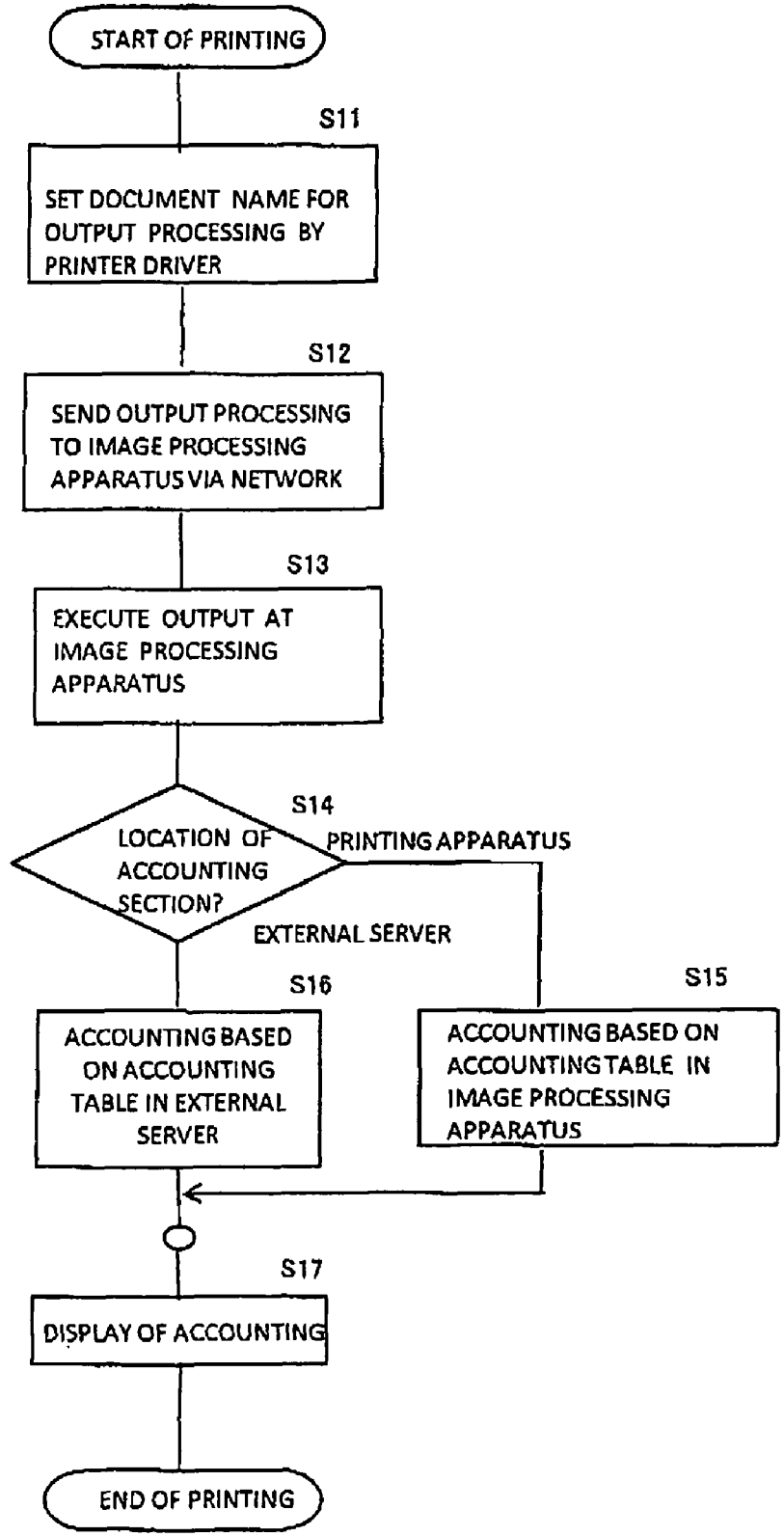
FIG. 8 is a flowchart to show the accounting procedure when image data is output.

Next, using FIG. 8, the outline of the processing executed in the accounting system relating to the present embodiment will be described. Here, description will be made on an example in which a user inputs an operating instruction to print image data on a recording sheet at the image processing apparatus 202. Further, the location at which a user inputs operating instruction is not limited to the client PC 100 and operating instructions may be input from the image processing apparatus (202, 203). Further, the arrangement that the image data is output by the image processing apparatus 202 is an example only and not intended to be limiting.

A user causes the printer driver 212 to be executed from the client PC 100 (S11). The CPU 101 of the client PC 100 displays an input screen for inputting operating instructions, on the display section 108 of the client PC 100 based on the printer driver 212. The user appropriately inputs an operating instruction such as the condition in which image data is output, to the input screen.

The input screen is provided with a document name entry column into which the document name of image data to be output is input by character, and a number of copies entry column into which the number of copies to be output is input. Further, the input screen is provided with a setting column into which detailed printing conditions are input. For example, a color print entry column in which whether or not performing color printing is set, a double-sided print entry column in which whether or not performing double-sided print is set, an intensive processing entry column in which whether or not performing intensive processing is set, a scaling factor entry column in which a scaling factor is set, and the like are included.

When input into the input screen is completed and an execution button is pressed by the user, the CPU 101 sends an operating instruction to the print control section 234 of one selected image processing apparatus 202 (S12). The print control section 234 confirms the image data to be output and the number of output copies thereof from the received operating instruction, and reads out the image data from the administration section 231 to output it to the printing section (S13).

The print control section 234 outputs image data and at the same time selects an accounting section (222, 235) for determining the accounting for the printing of the concerned image data based on the set information (S14). Further, the print control section 234 may select one of the two accounting sections 222 and 235 depending on the image data to be output.

When the accounting section 235 of the image processing apparatus 202 is selected, the print control section 234 outputs an operating instruction and information relating to the output of image data, to the accounting section 235. The accounting section 235 detects the situation in which a situation detection section makes output, from the received operating instruction and information, and a frequency detection section detects the number of image data outputs. Then, based on the detected result, the accounting corresponding to the detected result is extracted and determined from the administration table stored in the memory 237 (S15).

When the accounting section 222 of the administration server 201 is selected, the print control section 234 outputs an operating instruction and information relating to the output of image data, to the accounting section 222. The accounting section 222 detects the situation when a situation detection section makes output, from the received operating instruction and information, and a frequency detection section detects the number of times for which output has been made. Then, based on the detected result, the accounting corresponding to the detected result is extracted and determined from the administration table stored in the memory 221 (S16).

Figure 9:
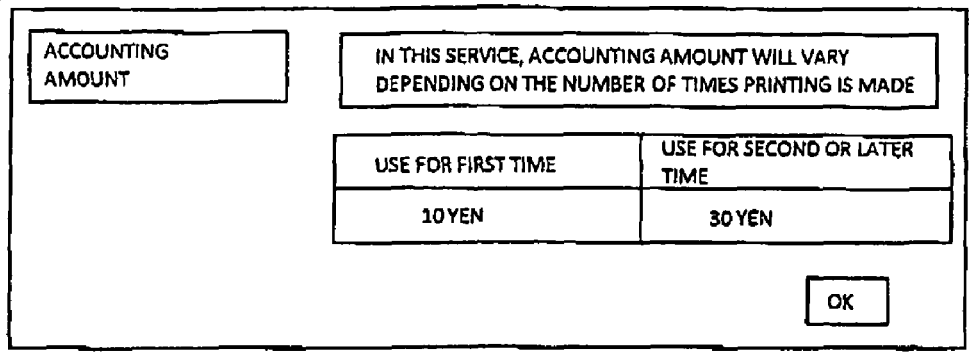
FIG. 9 shows a display screen of accounting.

When the accounting is determined, the accounting section (222, 235) outputs the accounting result to the CPU 101 to make the user visually recognize the content thereof. The CPU 101 causes the display section 108 to display the accounting contents such as shown in FIG. 9 based on the received contents. At the same time, the CPU 101 bills the accounting to the user. When the accounting from the user is recognized, the process is completed.

Next, the procedure by which the accounting section 222 determines accounting depending on the situation in which output is made and the frequency at which output is made will be described respectively based on the flowcharts of FIGS. 10 to 14. Although, for the convenience of description, it is assumed that the accounting section 222 installed in the administration server 201 decides the accounting, this is not limiting and the accounting may be determined by the accounting section 235 installed in the image processing apparatus 202.

Figure 10:
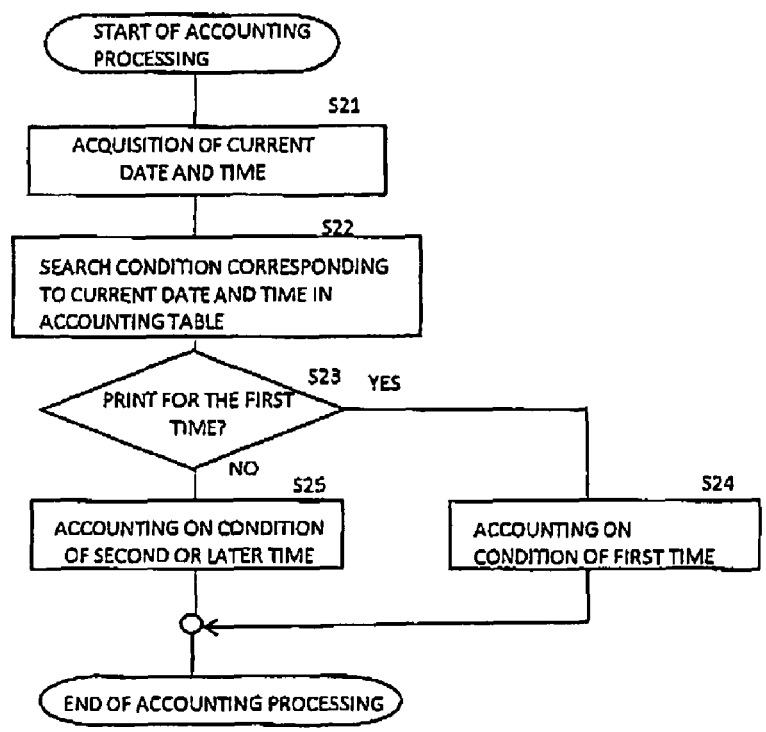
FIG. 10 is a flowchart to show the case in which the accounting is determined in terms of the date when output is made.

First, description will be made on a case in which accounting is determined based on the date when instruction for output of image data is provided, based on the flowchart of FIG. 10. The accounting section 222 of the administration server 201 detects the date when the situation detection section has output image data, from the received operating instruction and the information relating to the output of image data (S21). At the same time, the frequency detection section counts and detects the number of image data outputs (S21). Then, based on the detected date, a corresponding condition is searched in the accounting table (S22). When a condition corresponding to the detected date is detected, detected number of times for which output is made is confirmed (S24). When the output is made for the first time, the accounting for the first time is extracted from the accounting table (S25). When it is the second or later time, the accounting for the second or later time is extracted from the accounting table (S25).

Figure 11:
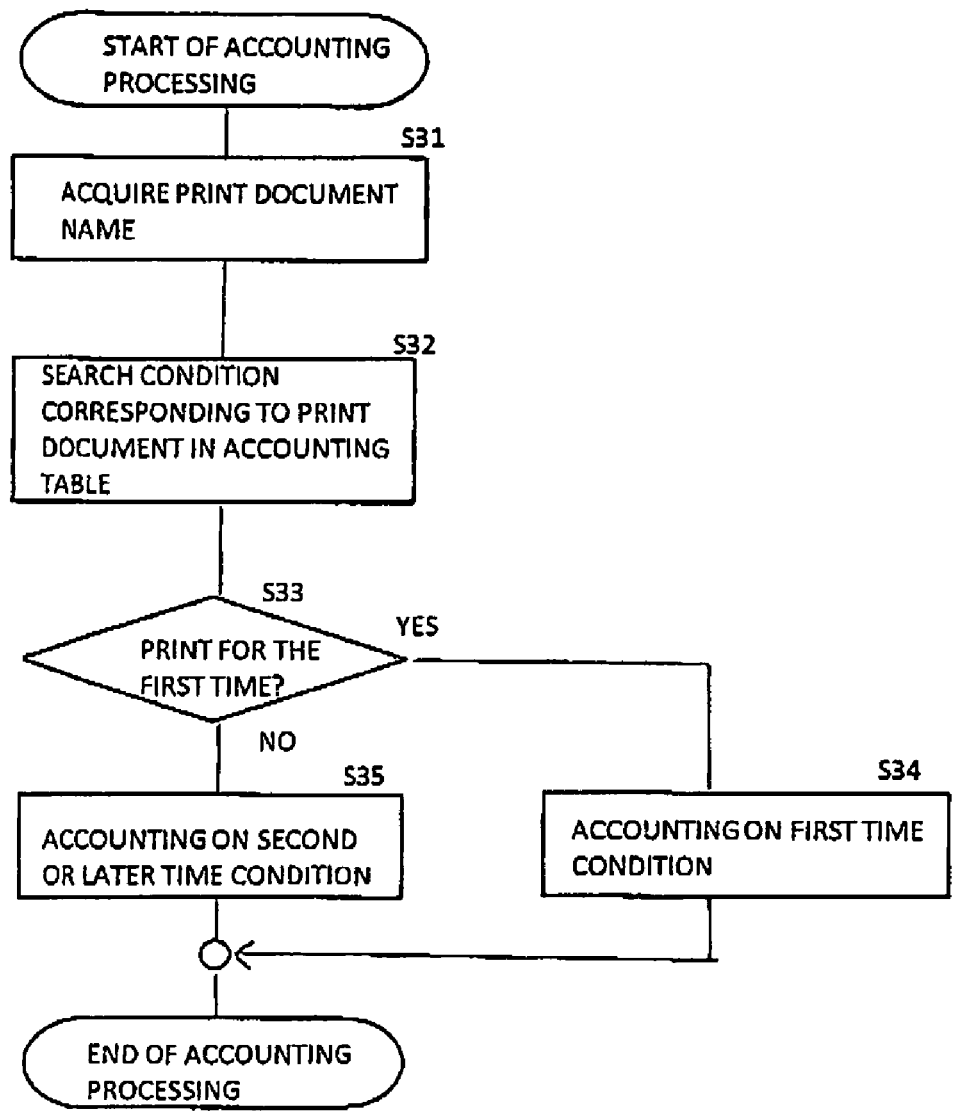
FIG. 11 is a flowchart to show the case in which the accounting is determined in terms of the document name.

A case in which the accounting is determined in terms of the document name of image data will be described based on the flowchart of FIG. 11. For the accounting table in this case, the accounting table of FIG. 3 is used. Moreover, for the procedure for determining the accounting, only the procedures from S21 to S23 of the case in which the accounting is determined based on the date are changed to procedures in which the document name of image data is acquired (S31) and in which a corresponding condition is searched in the accounting table based on the document name (S32), with other procedures being all same.

Figure 12:
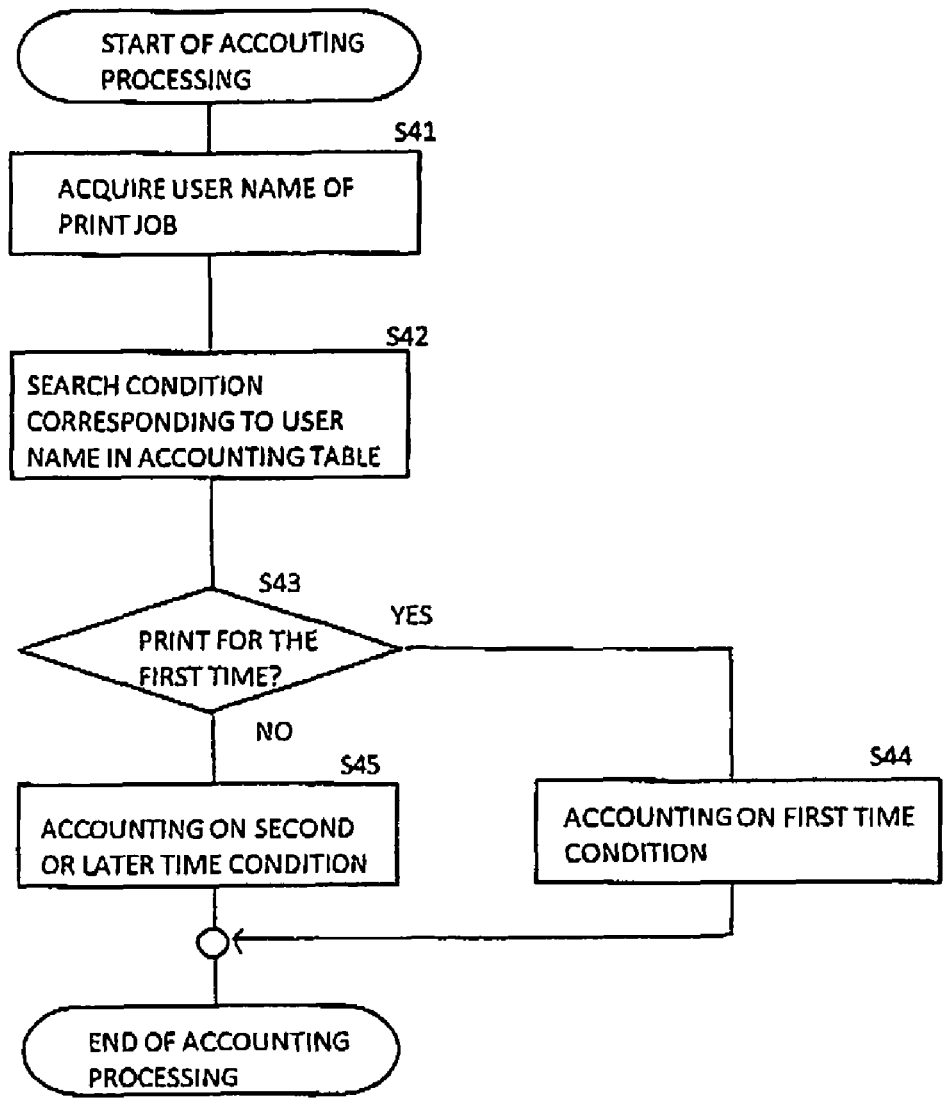
FIG. 12 is a flowchart to show the case in which the accounting is determined in terms of the user.

The case in which the accounting is determined in terms of the user who provides instruction for printing of image data will be described based on the flowchart of FIG. 12. For the accounting table in this case, the accounting table shown in FIG. 4 is used. Moreover, for the procedure for determining the accounting, only the procedures S21 to S23 in the procedure of the case in which the accounting is determined based on the date are changed to procedures in which the user who provides instruction for output is acquired (S41) and in which a corresponding condition is searched in the accounting table based on that user (S42), with other procedures being all same.

Figure 13:
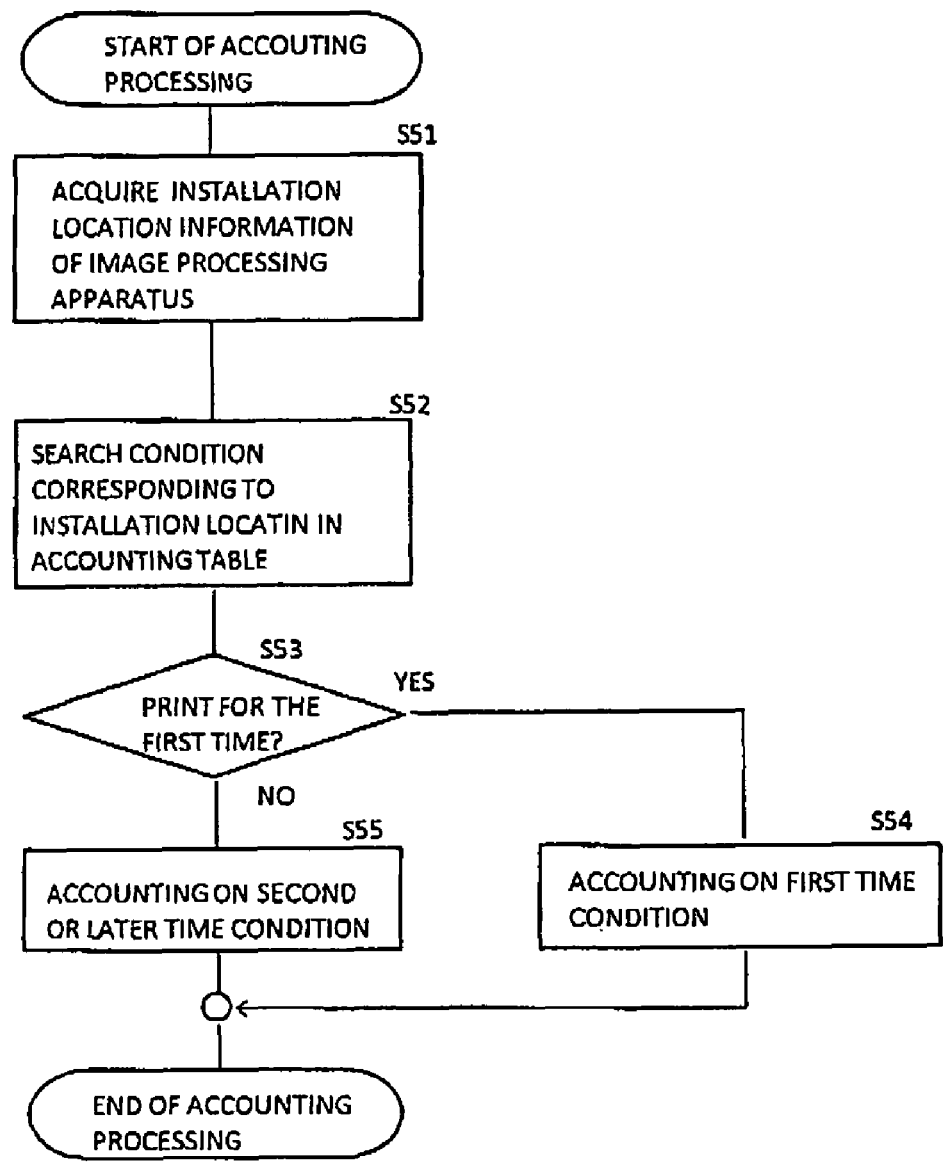
FIG. 13 is a flowchart to show the case in which the accounting is determined in terms of the installation location of the image processing apparatus.

The case in which the accounting is determined based on the installation location of the image processing apparatus 202 which makes output will be described based on the flowchart of FIG. 13. For the accounting table in this case, the accounting table of FIG. 5 is used. Moreover, for the procedure for determining the accounting, only the procedures S21 to S23 in the procedure of the case in which the accounting is determined based on the date are changed to procedures in which the installation location of the image processing apparatus 202 for making output is acquired (S51) and in which a corresponding condition is searched in the accounting table based on the installation location (S52), with other procedures being all same.

Figure 14:
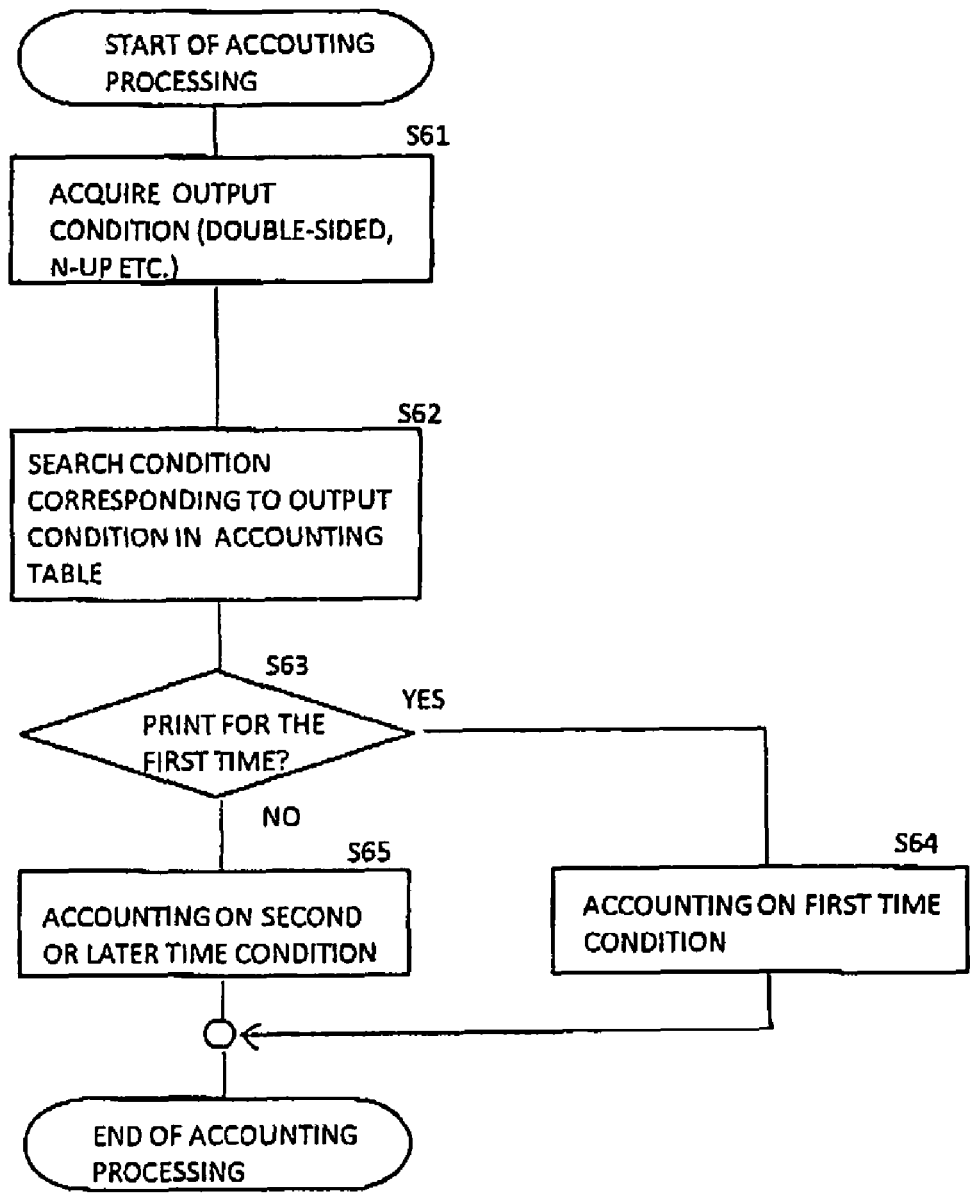
FIG. 14 is a flowchart to show the case in which the accounting is determined in terms of the printing condition of image data.

The case in which the accounting is determined based on the printing condition of image data is described based on the flowchart of FIG. 14. For the accounting table in this case, the accounting table shown in FIG. 6 is used. Moreover, for the procedures for determining accounting, only the procedures S21 to S23 in the procedure of the case in which the accounting is determined based on the date are changed to procedures in which the printing condition of image data is acquired (S61) and in which a corresponding condition is searched in the accounting table based on the printing condition (S62), with other procedures being all same.

As so far described, it is possible to determine the accounting relating to image data depending on the situation in which output is made. Further, since the accounting can be varied depending on the output frequency, it is possible, for example when a complementary coupon etc. is output, to prevent tampering such as that a large volume of printing is made to the same user.

Second Embodiment

Figure 15:
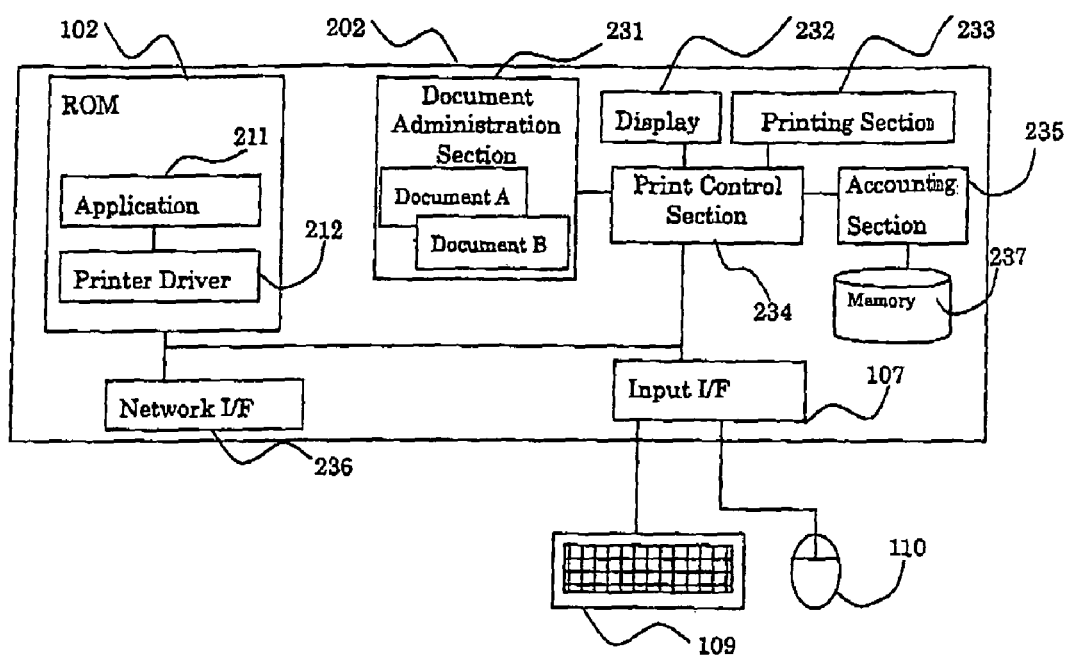
FIG. 15 is a block diagram to show the image processing apparatus relating to a second embodiment.

Next, a second embodiment of the present invention will be descried using FIG. 15. Further, the like parts with the first embodiment will be given the like symbols thereby omitting description thereof, and different portions will be described.

In the second embodiment, the image processing apparatus 301 is installed with all the functions of the client PC 100 and the administration server 201 of the first embodiment. Specifically, the image processing apparatus 301 comprises an input section 311 into which a user can input operating instruction, an accounting section 312 for determining accountings, an administration section 313 for administering the image data, and a memory 314 for storing an accounting table, with other parts being the same as those of the image processing apparatus of the first embodiment.

Since the procedures until the accounting is determined are the same as those of the first embodiment, description thereof will be omitted.

As described above, the image processing apparatus 301 alone can determine the accounting corresponding to the output of image data. Further, since the system will be completed with an image processing apparatus alone, installation work can be easily done.

Moreover, the present invention will not be limited to the above described embodiments and of course many modifications and alterations can be made to the above described embodiments within the scope of the present invention. Although the present invention has been described on the case in which image data stored in the administration section is output, it will not be limited to such a case and may be applied to a case in which music data is output such as downloading music data to the client PC. Alternatively, it may be a case in which image data is displayed on a display section.

In the present embodiment, although the accounting is determined depending on any one of the situations in which output is made, and the frequency at which output is made, accounting may be performed depending on a combination of multiple situations out of the situations in which output is made and the frequency at which output is made.

In the present embodiment, although billing of an accounting to a user is performed after image data is output, it may also be configured such that billing of a accounting to a user is performed before output is made and output is made after getting permission from the user.

Although the accounting table sets accountings for the cases in which the output is for the first time and in which the output is for the second or later time, it may also set a discount rate. For example, the configuration may be such that though there is no discount for the output for the first time, there is 5% discount on the accounting for the second time, 10% discount on the accounting for the third time, 15% discount on the accounting for the fourth time, and the like.

Although in the accounting table the number of times for which output is made is set to be two categories: the first time and the second or later time, it also can be set appropriately by the administrator. For example, it is set to be n-categories from 1st time to n-th time. Alternatively, the number of times for which output is made may be divided into ranges such as 1st to 5th time, 6th to 15th time, and the like.

Although a period of validity column is provided in the accounting table, there is no particular need to provide it. For example, in the case of a user A, when setting is made such that the accounting for the output of the first time is 10 yen, and the accounting for the output of the second or later time is 30 yen, accounting will be made with the set accounting when a user A makes output, until the setting is changed.

The accounting system relating to the first embodiment has been described for the case in which the system is made up of one client PC, one administration server, and two image processing apparatuses; however, this will not limit the numbers of the client PC, the image processing apparatus, and the administration server which makes up the accounting system.

The image processing apparatus may be a multi function processing machine (MFP) which provides not only the service of a printer function, but also services of duplicating (copying) and facsimile etc.

What is claimed is:

1. An image processing apparatus, comprising
    an image processing section configured to output image data,
    an accounting table storing: accountings corresponding to a situation in which each image data is output; and a frequency at which image data is output, and
    an accounting section configured to determine an accounting corresponding to the output of image data using the accounting table, the image data including image data related to coupons and an accounting being set to increase as the frequency for coupon outputs by the same user becomes larger, wherein
    said accounting section comprises a situation detection section for detecting situations in which image data is output from the image processing section and a frequency detection section for detecting a frequency at which image data is output from the image processing section, wherein
    said situation detection section detects, based on contents of a user's operating instruction or output information input from the image processing section, a document name to be output and a user name who provides instruction for output of image data, wherein
    said frequency detection section counts and stores a number of image data outputs based on the image data output by a user who provides instruction for output of image data, and wherein
    said accounting section determines, based on the document name of image data to be output detected by the situation detection section, whether image data to be output is a coupon or not, and, when the image data to be output is a coupon, determines an accounting, so as to increase as the frequency for coupon outputs becomes larger, based on the number of outputs of coupons by the same user detected by the frequency detection section, using the accounting table.

2. The image processing apparatus according to claim 1, wherein said situation detection section detects a date when image data is output, and said accounting section determines the accounting using the accounting table storing the accounting corresponding to the time and date.

3. The image processing apparatus according to claim 1, wherein said situation detection section detects a printing condition in which image data is output, and said accounting section determines the accounting using the accounting table storing the accounting corresponding to the printing condition.

4. The image processing apparatus according to claim 1, wherein said situation detection section detects a installation location of the image processing apparatus for outputting image data, and said accounting section determines the accounting using the accounting table storing the accounting corresponding to the installation location.

5. The image processing apparatus according to claim 1, wherein said accounting section notifies the contents of the determined accounting prior to the output of image data.

6. An accounting system, comprising:
    a plurality of image processing apparatuses configured to make output of image data; and
    an administration server configured to administer said plurality of image processing apparatuses, wherein
    said administration server comprises
    an acquisition section configured to acquire information relating to the output of image data from said image processing apparatuses,
    an accounting table storing accountings corresponding to the situation in which each image data is output and the frequency at which image data is output, and
    an accounting section configured to determine an accounting corresponding to the output of image data using the accounting table, the image data including image data related to coupons and an accounting being set to increase as the frequency for coupon outputs by the same user becomes larger, wherein
    said accounting section comprises a situation detection section for detecting situations in which image data is output and a frequency detection section for detecting the frequency at which image data is output from the image processing section,
    said situation detection section detects, based on contents of a user's operating instruction, which the acquisition section obtains from the image processing apparatus, or output information input from the image processing section, a document name to be output and a user name who provides instruction for output of image data,
    said frequency detection section counts and stores the number of image data outputs based on the image data output by a user who provides instruction for output of image data, and
    said accounting section determines, based on the document name of image data to be output detected by the situation detection section, whether image data to be output is a coupon or not, and, when the image data to be output is a coupon, determines an accounting, so as to increase as the frequency for coupon outputs becomes larger, based on the number of outputs of coupons by the same user detected by the frequency detection section, using the accounting table.

* * * * *